United States Patent [19]

Ikola et al.

[11] Patent Number: 5,110,340
[45] Date of Patent: May 5, 1992

[54] APPARATUS FOR REMOVING A MARGINAL ZONE EXTERNAL OF AN OUTLINE CUT IN A GLASS SHEET

[75] Inventors: Kimmo J. Ikola, Kangasala; Kimmo E. Stenman, Tampere, both of Finland

[73] Assignee: Tamglass Oy, Finland

[21] Appl. No.: 529,664

[22] Filed: May 29, 1990

[30] Foreign Application Priority Data

Jun. 9, 1989 [FI] Finland .................................. 892858

[51] Int. Cl.$^5$ .............................................. C03B 33/09
[52] U.S. Cl. ...................................... 65/269; 65/113; 65/174; 225/93.5; 225/103
[58] Field of Search ...................... 65/70, 97, 105, 112, 65/113, 174, 176, 269; 225/2, 93.5, 96.5, 97, 103

[56] References Cited

U.S. PATENT DOCUMENTS

| | | | |
|---|---|---|---|
| 3,215,345 | 11/1965 | Ferguson | 65/97 |
| 3,465,934 | 9/1969 | Ono et al. | 225/96.5 |
| 3,520,457 | 7/1970 | Augustin | 225/96.5 |
| 4,033,490 | 7/1977 | Ulivi | 225/2 |
| 4,140,258 | 2/1979 | Gray | 225/2 |
| 4,698,088 | 10/1987 | Bando | 65/174 |

FOREIGN PATENT DOCUMENTS 0315202  5/1989  European Pat. Off.
418847   6/1981  Sweden.

Primary Examiner—Joye L. Woodard
Attorney, Agent, or Firm—Burns, Doane, Swecker & Mathis

[57] ABSTRACT

A glass sheet has marginal zones thereof removed by (a) subjecting the marginal zones to a heating flame, and (b) raising the glass sheet (during or after the flame heating) while restraining upward travel of the marginal zones. The lifting is performed by suction cups which depend from a movable carriage, and the restraining is performed by removing members having inclined lower faces disposed over the marginal zones. The removing members are connected to rods which carry the suction cups, the rods and removing members being relatively movable upwardly and downwardly. The rods are horizontally adjustable relative to the carriage for repositioning the suction cups and removing members relative to a glass sheet.

3 Claims, 3 Drawing Sheets

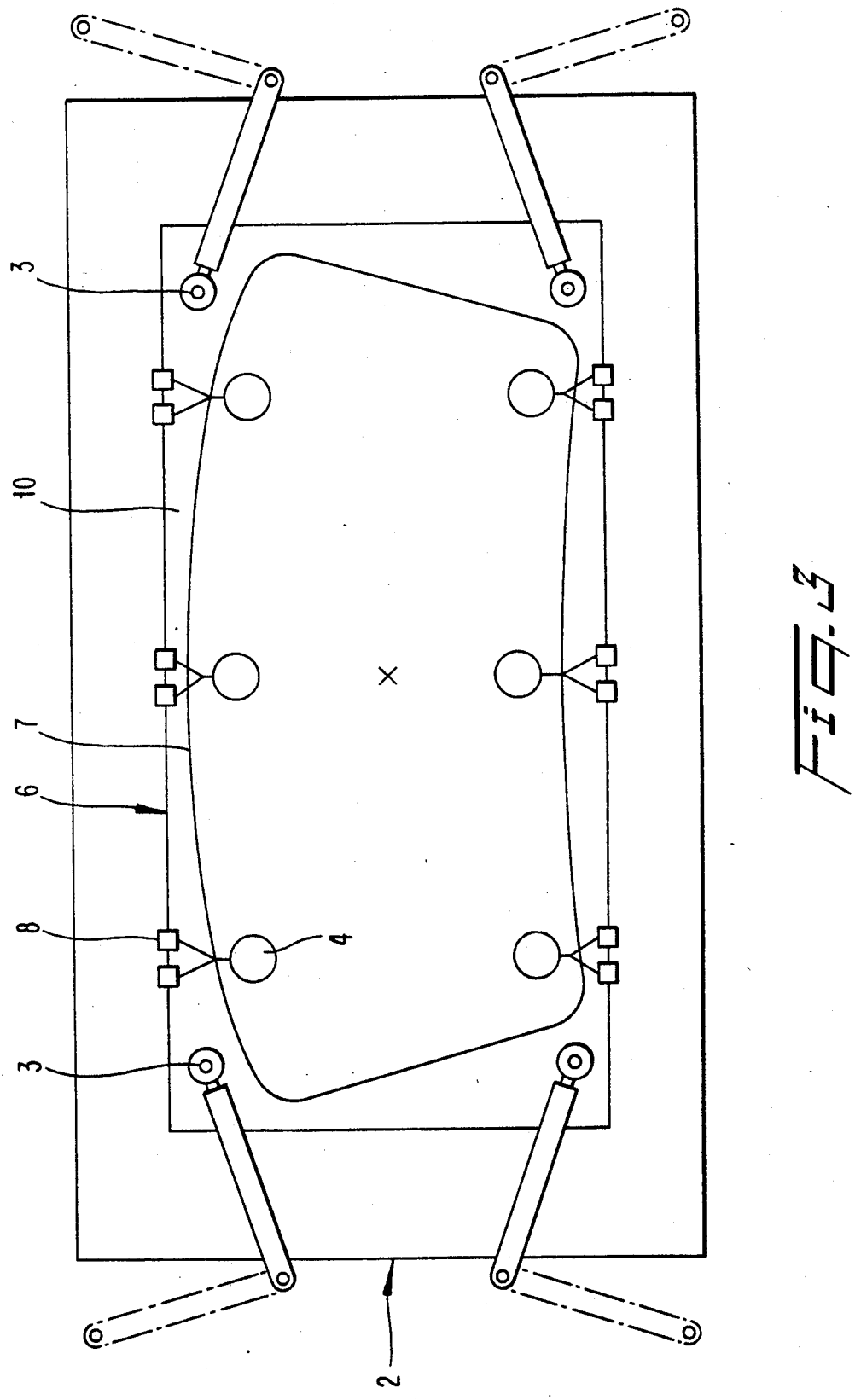

APPARATUS FOR REMOVING A MARGINAL ZONE EXTERNAL OF AN OUTLINE CUT IN A GLASS SHEET

BACKGROUND AND SUMMARY OF THE INVENTION

Field of the Invention

The present invention relates to a method for removing a marginal zone external of an outline cut in a glass sheet, in which method a glass sheet is carried by means of a suction-padded conveyor carriage to a marginal zone removing station, wherein the marginal zone to be removed is subjected to the action of a heating flame by means of a flame burner.

The invention relates also to an apparatus for carrying out the method. The apparatus includes a conveyor carriage fitted with ascendable and descendable suction pads and a marginal zone removing station fitted with flame burners for applying a heating flame to the marginal zone to be removed.

The currently available solutions include a flame-effected removal on the one hand and a mechanical removal on the other. In the flame-effected removal procedure, a marginal zone to be removed is first subjected to a heating flame and the corners are then cut open by sharp cutting flames. A drawback in flame-effected removal is a wide marginal zone required thereby, resulting in a large loss of glass. Another drawback is that automatization of a plurality of flame stations is complicated in mixed production. In mechanical removal, the opening of corners is effected by means of a cutting knife and it further requires the use of presses for forcing the marginal zone loose. First of all, a drawback is that two separate removing stations are required and, furthermore, this removing method is also difficult to automatize in mixed production.

An object of the invention is to provide a method and an apparatus applicable to the removal of a marginal zone in a glass sheet, which make it possible to remove a very narrow marginal zone (5-10 mm) and whose operation can be automated in a simple fashion.

This object is achieved by means of the invention on the basis of the method features set forth in the annexed claim 1 and the apparatus features set forth in claim 2.

BRIEF DESCRIPTION OF THE DRAWINGS

One embodiment of the invention will now be described in more detail with reference made to the accompanying drawings, in which

FIG. 3 shows an edge-removing station 2 in a schematic plan view.

DETAILED DESCRIPTION

Figure 1:
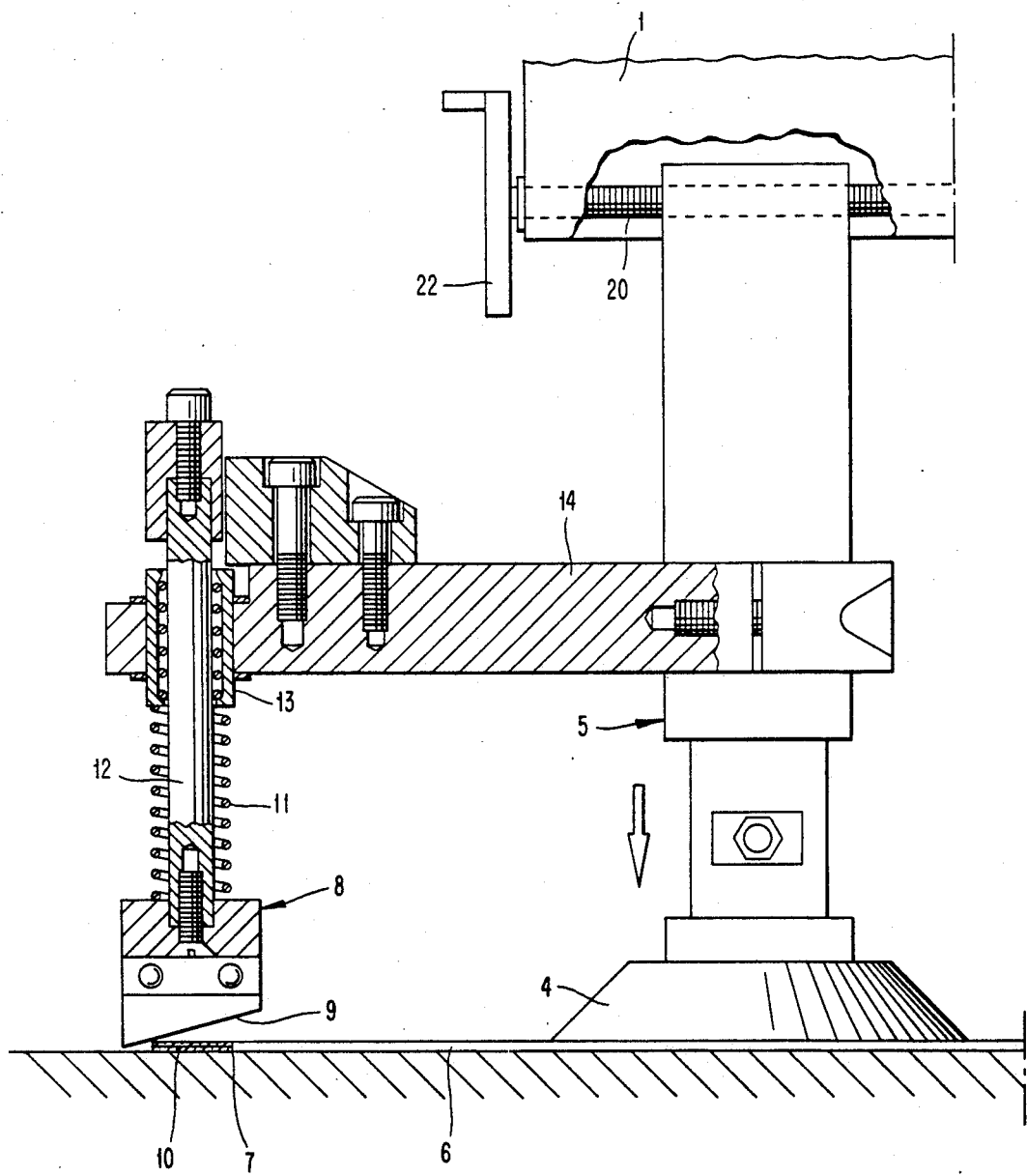
FIG. 1 illustrates a mechanical cut-off means included in an edge-removing apparatus of the invention and connected to the suction-pad rod of a conveyor carriage. The apparatus is shown at the first removing stage with a frame heating applied to a marginal zone 10 to be removed.
Figure 2:
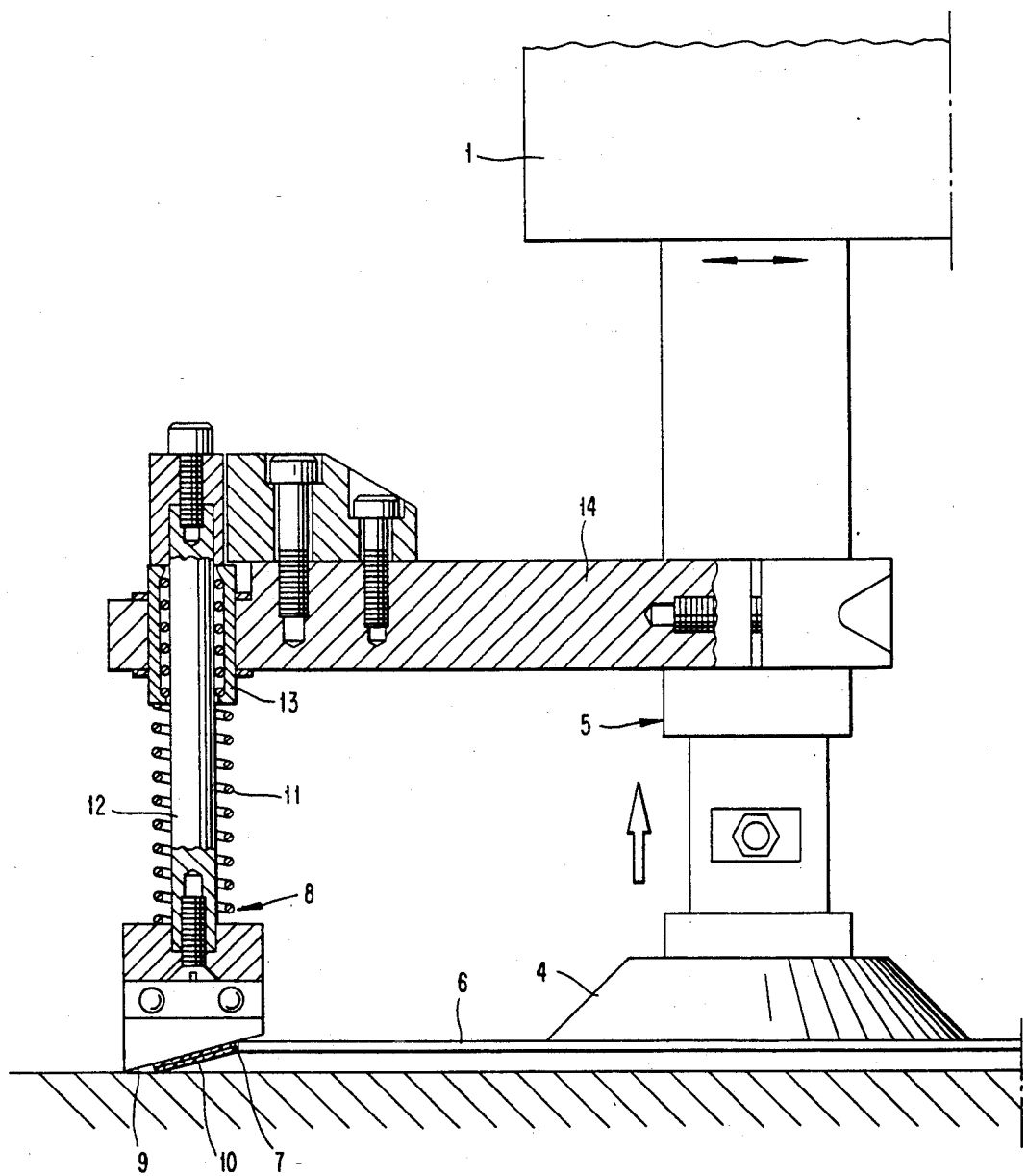
FIG. 2 shows the apparatus of FIG. 1 at the second removing stage with mechanical cut-off means 8 colliding against a possibly non-removed marginal zone 10 for removing it from a glass sheet 6.

A method and apparatus of the invention can be applied e.g. in the connection of an assembly described in FI patent application Ser. No. 885,048.

A conveyor carriage 1 fitted with suction pads 4 is used to remove the marginal zones of a glass sheet at a marginal-zone removing station and, after the removal, to carry the sheet to an edge-grinding station (not shown). In the edge-cutting station, a rectangular glass sheet 6 is provided with a cut outline 7, whereby a marginal zone 10 remaining outside said outline is to be removed in an edge-removing station 2. In the edge-removing station, the carriage 1 having suction-pad rods 5 mounted thereon is lowered onto a glass sheet 6 (see FIG. 1). This is followed by subjecting the four corners of glass sheet 6 to the action of heating flames by means of flame burners 3, the thermal stresses produced thereby removing and crushing said marginal zone 10 external of outline 7. However, along the long sides of glass sheet 6, the long and narrow marginal zones 10 do not always come loose. In this invention, the removal thereof is secured by means of mechanical removing members 8 which are mounted on rods 5 of suction pads 4 by means of horizontal brackets 14. Thus, the removing members 8 are spaced a certain horizontal distance from suction pads 4. As the size of a glass sheet changes, the location of suction pads 4 is adjusted by displacing suction-pad rods 5 in horizontal direction and, thus, said removing members 8 are also automatically carried to a correct location within the boundaries of a marginal zone 10 to be removed. Any conventional mechanism can be provided to horizontally adjust the rods 5, such as a rotary screw 20 which is carried by the carriage 1 and threadedly connected in a threaded hole 22 at the upper end of the rod. By rotating the screw 20, the associated rod 5 is displaced horizontally relative to the carriage 1.

A spring 11 urges said removing members 8 downwards. A rod 12 is movable through a linear bearing 13, whereby said removing member 8 can be urged upwards against the force of spring 11.

The cut-off head of a removing member 8 is provided with a bottom surface 9 bevelled to rise from inside towards outside, whereby the removing member 8 does not require exactly precise positioning in lateral direction.

When a glass sheet 6 is laid upon the base of an edge-removing station, said removing members 8 collide with the base and rise upwards against the force of spring 11 (FIG. 1). This is followed by a heating shock effected by flame burners 3 for breaking and removing the marginal zone 10. However, along the long sides there may remain unremoved edge portions if the zone 10 to be removed is narrow. This is followed by lifting the carriage 1, thereby producing a lifting of glass sheet 6 by means of suction pads 4. The tension of spring 11 prevents removing members 8 from rising along, the possibly unremoved edge portions 10 striking against said inclined bottom surfaces 9 of removing members 8 for detaching said marginal zone 10 along outline 7. The glass sheet is ready to be carried to an edge-grinding station.

It is obvious that the invention is not limited to the above preferred embodiment but many modifications of the invention are conceivable within the scope of the annexed claims. For example, the relative movement of removing members 8 and suction pads 4 can be arranged in a variety of ways.

We claim:

1. An apparatus for removing a marginal zone from a glass sheet, wherein the marginal zone is located outside an outline cut in the glass sheet, comprising:

a conveyor carriage;

a plurality of suction pad rods mounted on said conveyor carriage for movement therewith;

a plurality of suction pads mounted to said suction pad rods for attachment to and carrying of the glass sheet;

a plurality of mechanical removing means mounted on respective ones of said suction pad rods, said removing means and its respective suction pad rod being capable of relative movement upwardly and downwardly;

means for heating the marginal zone for at least partially removing the marginal zone from the glass sheet, said heating means including flame burners; and means for moving said suction pad rods and suction pads upwardly relative to said mechanical removing means whereby upward movement of the marginal zone is restrained by said mechanical removing means to cause the marginal zone to be removed from the glass sheet;

said suction pad rods being horizontally movable relative to said conveyor carriage so that said suction pads and said mechanical removing means can be horizontally adjusted relative to the glass sheet.

2. An apparatus as claimed in claim 1, wherein said mechanical removing means includes a beveled contact surface which extends lower at an outside edge thereof than at an inside edge thereof.

3. An apparatus as claimed in claim 1, including springs urging said mechanical removing means downwardly relative to said suction pad rods.

* * * * *